(12) United States Patent
Hsu

(10) Patent No.: US 8,294,321 B2
(45) Date of Patent: Oct. 23, 2012

(54) BRUSHLESS MACHINE HAVING FERROMAGNETIC SIDE PLATES AND SIDE MAGNETS

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/101,241

(22) Filed: May 5, 2011

(65) Prior Publication Data

US 2011/0204741 A1 Aug. 25, 2011

Related U.S. Application Data

(60) Division of application No. 12/393,582, filed on Feb. 26, 2009, now abandoned, which is a division of application No. 11/162,753, filed on Sep. 21, 2005, now Pat. No. 7,518,278, which is a continuation-in-part of application No. 11/019,075, filed on Dec. 21, 2004, now Pat. No. 6,972,504, which is a continuation-in-part of application No. 10/848,450, filed on May 18, 2004, now Pat. No. 6,989,619.

(60) Provisional application No. 60/675,419, filed on Apr. 27, 2005.

(51) Int. Cl.
*H02K 1/27* (2006.01)

(52) U.S. Cl. ............... 310/156.64; 310/156.56; 310/263; 310/156.53

(58) Field of Classification Search .................. 310/263, 310/156.53, 156.64, 268, 156.32, 156.48, 310/156.66–156.73
See application file for complete search history.

(56) References Cited

U.S. PATENT DOCUMENTS

| | | | |
|---|---|---|---|
| 3,411,027 A | 11/1968 | Rosenburg | |
| 5,132,581 A * | 7/1992 | Kusase | 310/263 |
| 5,929,547 A * | 7/1999 | Kim | 310/156.53 |
| 5,952,758 A * | 9/1999 | Lucidarme et al. | 310/162 |
| 6,057,622 A | 5/2000 | Hsu | |
| 6,087,751 A | 7/2000 | Sakai | |
| 6,097,124 A | 8/2000 | Rao et al. | |
| 6,229,239 B1 * | 5/2001 | Lucidarme et al. | 310/162 |
| 6,441,525 B1 | 8/2002 | Koharagi et al. | |

(Continued)

FOREIGN PATENT DOCUMENTS

JP 2004072822 * 3/2004

OTHER PUBLICATIONS

Machine Translation of JP2004072822, motor, Mar. 4, 2004, Fumio Hamaoka.*

*Primary Examiner* — Karl Tamai
(74) *Attorney, Agent, or Firm* — Luedeka Neely Group, P.C.

(57) ABSTRACT

An apparatus is provided having a cylindrical stator and a rotor that is spaced from a stator to define an annular primary air gap that receives AC flux from the stator. The rotor has a plurality of longitudinal pole portions disposed parallel to the axis of rotation and alternating in polarity around a circumference of the rotor. Each longitudinal pole portion includes portions of permanent magnet (PM) material and at least one of the longitudinal pole portions has a first end and an opposing second end and a side magnet is disposed adjacent the first end and a side pole is disposed adjacent the second end.

4 Claims, 5 Drawing Sheets

U.S. PATENT DOCUMENTS

| | | | |
|---|---|---|---|
| 6,462,449 B1 * | 10/2002 | Lucidarme et al. | 310/156.56 |
| 6,538,358 B1 * | 3/2003 | Krefta et al. | 310/263 |
| 6,573,634 B2 | 6/2003 | Hsu | |
| 6,703,741 B1 | 3/2004 | Ifrim | |
| 6,972,504 B1 | 12/2005 | Hsu | |
| 6,989,619 B2 | 1/2006 | Hsu | |
| 7,129,611 B2 | 10/2006 | Hsu | |
| 2002/0180297 A1 * | 12/2002 | Ifrim | 310/168 |
| 2004/0232794 A1 | 11/2004 | Hsu | |
| 2005/0001505 A1 | 1/2005 | Hsu | |
| 2006/0290221 A1 | 12/2006 | Hsu | |
| 2011/0204741 A1 * | 8/2011 | Hsu | 310/156.53 |

* cited by examiner

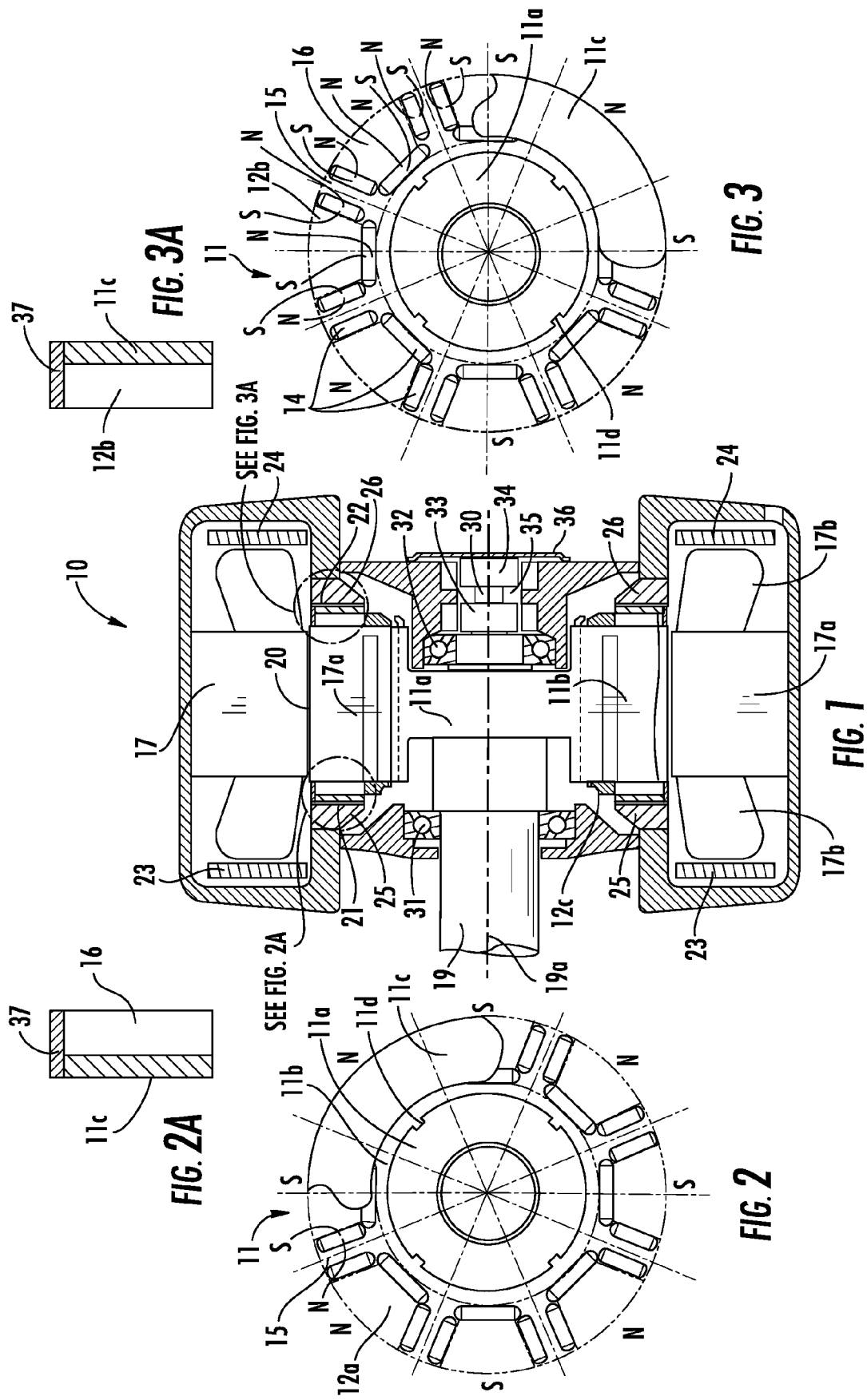

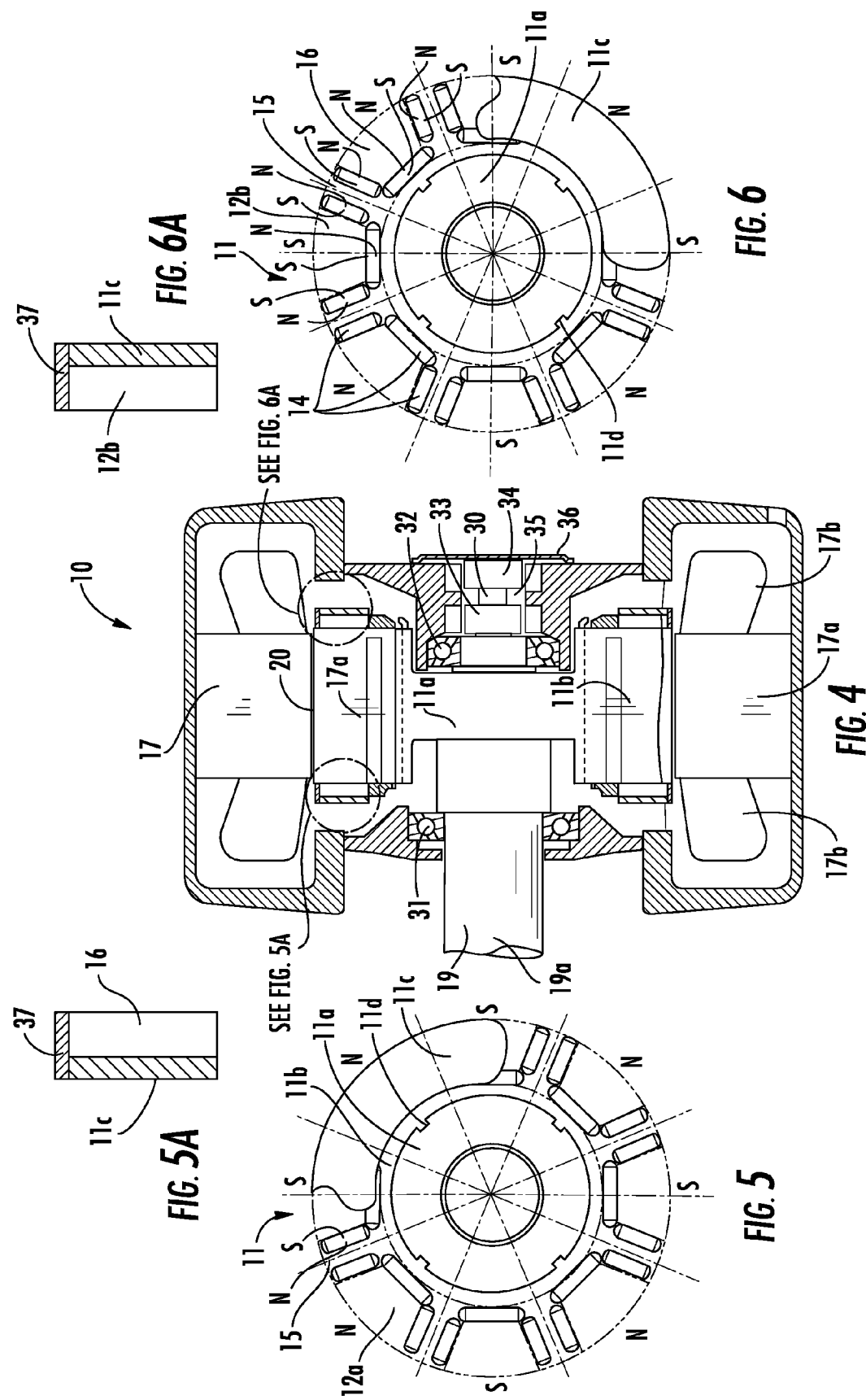

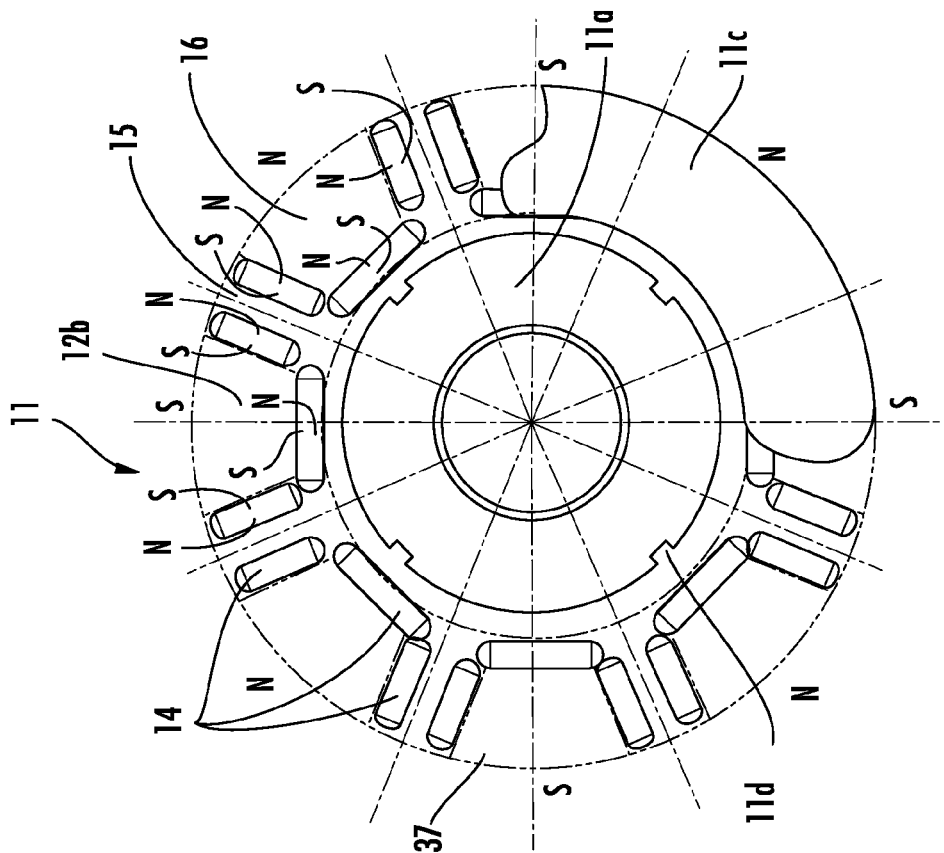
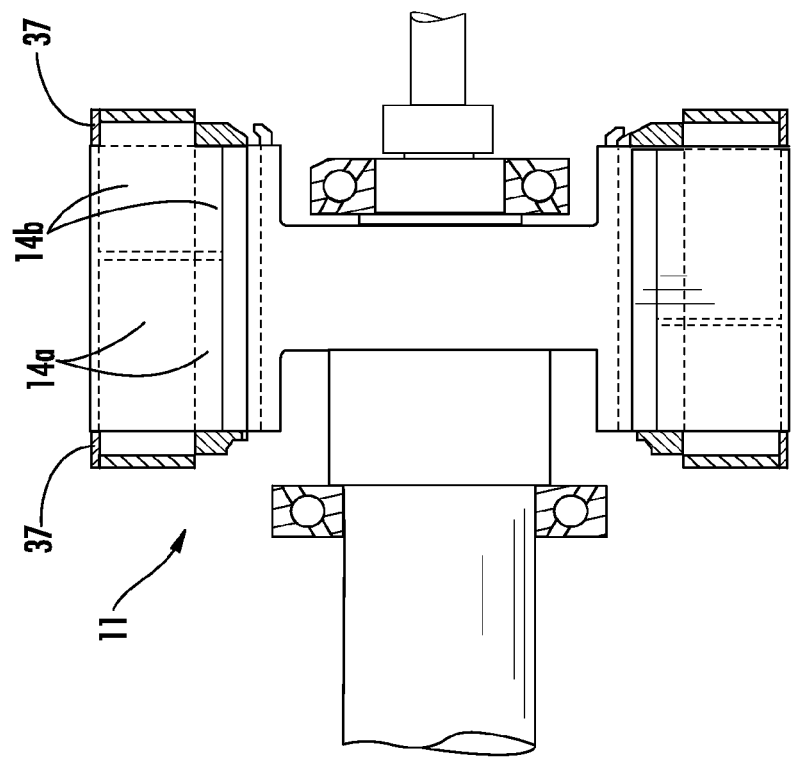

ically, about 0.8
BRUSHLESS MACHINE HAVING FERROMAGNETIC SIDE PLATES AND SIDE MAGNETS

CROSS-REFERENCE TO RELATED APPLICATION

This application is a Divisional Application of currently pending U.S. patent application Ser. No. 12/393,582 filed Feb. 26, 2009, entitled "BRUSHLESS MACHINE WITH TAPERED POLES." This application and U.S. patent application Ser. No. 12/393,582 filed Feb. 26, 2009 are Divisional Applications of U.S. patent application Ser. No. 11/162,753 filed Sep. 21, 2005, entitled "IMPROVEMENTS FOR HIGH STRENGTH UNDIFFUSED BRUSHLESS MACHINE AND METHOD," which issued as U.S. Pat. No. 7,518,278, and which is a continuation-in-part of U.S. patent application Ser. No. 11/019,075 filed Dec. 21, 2004, entitled "PERMANENT MAGNET MACHINE AND METHOD WITH RELUCTANCE POLES FOR HIGH STRENGTH UNDIFFUSED BRUSHLESS OPERATION," which issued as U.S. Pat. No. 6,972,504 on Dec. 6, 2005, which is a continuation-in-part of U.S. patent application Ser. No. 10/848,450 filed May 18, 2004, entitled "ROTOR APPARATUS FOR HIGH STRENGTH UNDIFFUSED BRUSHLESS ELECTRIC MACHINE," which issued as U.S. Pat. No. 6,989,619 on Jan. 24, 2006. This application and application Ser. Nos. 12/393, 582, 11/162,753, 11/019,075, and 10/848,450 claim priority to U.S. Provisional Patent Application 60/675,419, filed Apr. 27, 2005, entitled "IMPROVEMENTS ON HIGH STRENGTH UNDIFFUSED MACHINE," and is herein incorporated by reference in its entirety. This application is related to Hsu's previous U.S. Pat. Nos. 6,310,417 issued Oct. 30, 2001; 6,573,634 issued Jun. 3, 2003; and 6,700,297 issued Mar. 2, 2004, all herein incorporated by reference.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including permanent magnet (PM) machines and PM-reluctance machines. This invention specifically pertains to configurations of brushless machine rotor poles.

DESCRIPTION OF THE BACKGROUND ART

There are three major types of brushless electric machines available for the electric vehicle (EV) and hybrid electric vehicle (HEV) drive systems. These are the induction machine, the PM machine, and the switched-reluctance machine.

Permanent magnet (PM) machines with and without reluctance paths have been recognized for having a high power density characteristic. A PM rotor does not generate copper losses. One drawback of the PM motor for the above-mentioned application is that the air gap flux produced by the PM rotor is limited, and therefore, a sophisticated approach is required for high speed, field weakening operation. Another constraint is that inductance is low, which means that current ripple must be controlled.

It is understood by those skilled in the art that a PM electric machine has the property of high efficiency and high power density. However, the air gap flux density of a PM machine is limited by the PM material, which is normally about 0.8 Teslas and below. A PM machine cannot operate at an air gap flux density as high as that of a switched reluctance machine. When the PM motor needs a weaker field with a reasonably good current waveform for high-speed operation, a sophisticated power electronics inverter is required.

When considering a radial gap configuration for undiffused, high strength operation, several problems have to be overcome. It is desirable to provide a compact design with a shape similar to a conventional radial gap machine and to include laminated rotor-core structure.

It would also be beneficial to further enhance the control of the field above that which is available with known PM rotor constructions. This would increase the motor torque. It is also an objective to accomplish this while retaining the compactness of the machine.

The enhanced field weakening can reduce the field strength at high speed to lower the back EMF produced in the winding. Therefore, for a specified DC link voltage, the speed range of the machine can be increased over what it otherwise would be. This will meet the compactness objective and allow simplification of the drive system requirements.

The permanent magnet (PM) motor is known to have higher power density among motors. However, the air-gap flux density of a PM motor is fixed due to the "permanent" nature of the magnet. The HSUB motor with the field enhancement and weakening capabilities can overcome the drawbacks of the PM motors.

SUMMARY OF THE INVENTION

The electric machine may have at least one improved feature selected from the group consisting of at least one device selected from the group consisting of side magnets, side poles, flux-guiding magnets, ferromagnetic end plates, and ring bands.

The electric machine may have at least one improved feature selected from the group consisting of flux-guiding magnets, side magnets, side poles, side ring, retaining rings, axial stationary flux path, and stationary excitation coils. Embodiments of the invention may incorporate a method and apparatus in which a rotor and a stator define a radial air gap for receiving AC flux.

Embodiments of the invention provide increased power and torque without increasing the size of the machine.

Embodiments of the invention are applicable to both AC and DC machines, and to both motors and generators.

Embodiments of the invention are applicable to both PM machines with and without reluctance paths, respectively. The reluctance paths are known for producing reluctance torque components.

Embodiments of the invention are applicable to both PM machines with and without stationary excitation field coils and stator axial flux paths.

Embodiments of the invention provide a compact electric machine structure for application to electric or hybrid vehicles.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples however are not exhaustive of the various embodiments of the invention, and therefore reference is made to the claims which follow the description for determining the scope of the invention.

BRIEF DESCRIPTION OF THE DRAWINGS

FIG. 1 is a longitudinal section view of a HSUB machine with brushless excitation;

FIGS. 2 and 3 are end views of the rotor incorporated in the assembly in FIG. 1;

FIGS. 2a and 3a are close-ups of the rotor face at the axial gaps;

FIG. 4 is a longitudinal section view of a HSUB machine without brushless excitation;

FIGS. 5 and 6 are end views of the rotor incorporated in the assembly in FIG. 4;

FIGS. 5a and 6a are close-ups of the rotor face at the axial gaps;

FIG. 7 shows the flux-guide magnets on the rotor. As an option, the magnet strength on the left hand side can be chosen to be different from the right hand side.

FIG. 8 is an end view of the rotor seen in FIG. 7;

DETAILED DESCRIPTION OF THE PREFERRED EMBODIMENTS

Figure 10:
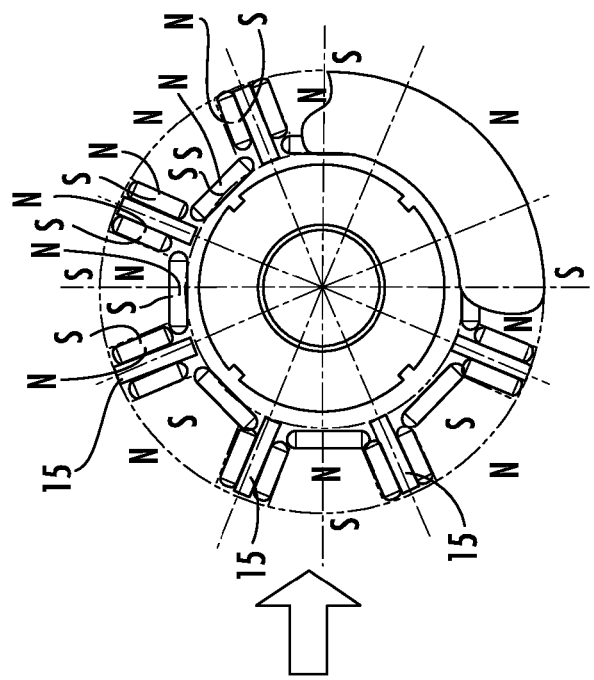
FIGS. 9 and 10 show the rotor with and without both reluctance poles and additional side magnets, respectively.

The principle of a high strength, undiffused brushless machine has been previously disclosed in the Hsu, U.S. Pat. No. 6,573,634, issued Jun. 3, 2003, Hsu, U.S. patent application Ser. No. 10/688,586 filed Sep. 23, 2003, and Hsu U.S. patent application Ser. No. 10/848,450 filed May 18, 2004, the disclosures of which are hereby incorporated by reference.

For a conventional PM machine the air-gap flux density is about 0.6 to 0.8 Teslas and cannot be weakened without the aid of some sophisticated power electronics. Both the stationary excitation coil and the PM material in the rotor maximize rotor flux in the PM machines of the embodiments of the present invention. These embodiments can produce two to three times the air gap flux density of a conventional PM machine. Because the PM torque produced by an electric machine is directly proportional to the air gap PM flux density, a higher torque, more powerful machine is provided with only small additions to size and weight.

FIG. 1 shows a longitudinal section view of a radial gap, high strength undiffused machine 10 with eight side poles 12a, 12b in a rotor assembly 11. FIGS. 2 and 3 each show the eight side poles 12a and 12b attached to the sides of the rotor core in an area bounded by eight sets of flux-guiding magnets 14 that consist of three pieces of magnets for guiding flux towards the radial air gap 20 for the sample eight-pole machine. The eight side magnets 16 help to prevent leakage flux at the rotor sides. Optionally, reluctance side poles 15 are provided by the portions of the rotor positioned in between the side magnet 16 and side pole 12a and 12b and between the flux-guiding magnets 14 without contacting the flux-guiding magnets 14. The reluctance side poles 15 allow the flux produced by a stator 17 to go through these reluctance side poles 15 easier than the path going through the side poles 12a and 12b.

The rotor assembly 11 is preferably made as described in the disclosures cited above, namely, the rotor has a hub 11a and a plurality of laminations 11b of ferromagnetic material are mounted and stacked on the hub 11a and clamped by non-magnetic end plates 12c. The rotor laminations 11b and ferromagnetic end plates 11c have keyed projections 11d for insertion in keyways in the rotor hub 11a. The ferromagnetic end plates 11c can be made of solid mild steel or stacked laminations.

The side poles 12a, 12b are made of ferromagnetic material. The flux-guiding magnets 14 can be pre-formed pieces or the injected type. Between pieces of flux-guiding magnets 14, an epoxy material can be used to fill gaps. Side magnets 16 are separate pieces attached to the ends of the rotor assembly 11. Bolts (not shown) are used to hold the side poles 12a, 12b and ferromagnetic end plates 11c in position. Ring band 37 can hold the side poles 12a, 12b, side magnets 16, and ferromagnetic end plate 11c in place to withstand the centrifugal force.

The machine 10 optionally has brushless excitation as shown in FIGS. 1 and 4. Brushless excitation of FIG. 1 is provided by stationary coils 23 and 24 and stationary flux collectors 25 and 26. No brushless excitation is used in FIG. 4 wherein the machine 10 is absent stationary coils and stationary flux collectors.

The rotor assembly 11 rotates with a main drive shaft 19 around an axis of rotation 19a. The stator 17 is disposed around the rotor 11 and has a laminated core 17a and windings 17b as seen in a conventional AC machine. The rotor assembly 11 is separated from the stator 17 by a radial air gap 20, which is also referred to herein as the primary air gap. AC flux is produced in this air gap 20 by the stator field. With brushless excitation, the rotor assembly 11 is separated from the stationary flux collectors 25 and 26 by axial air gaps 21 and 22, respectively. These air gaps 21, 22 are oriented perpendicular to the axis 19a of the rotor 11. DC flux will be produced in these air gaps 21, 22 by excitation coils 23 and 24. Stationary flux collectors 25 and 26 are disposed at the axial air gaps 21, 22. The laminated option of stationary flux collector can further smooth the DC flux component and reduce the possible occurrence of eddy currents.

The drive shaft 19 is supported by bearings 31 and 32. A short internal shaft 30 is also coupled to the rotor 11. A shaft encoder 33 and a pump 34 for lubricant for the motor 10 are situated inside a passageway 35 through the hollow center of the excitation coil 24. A housing cover 36 closes the passageway 33.

Referring to FIG. 2, the DC flux produced by the excitation coils 23, 24 is conducted into the rotor from one set of the ferromagnetic side poles 12a attached to the N polarity of the rotor, and then turns to flow radially outward across the main air gap 20 into the stator core 17a, then loops and returns radially inward and is conducted axially outward through adjacent side poles 12b attached to the S polarity at the other end of the rotor 11 (FIG. 3). The DC flux produced by the excitation coils does not pass through the reluctance side poles 15. The DC flux return path 38 (labeled in FIG. 11) goes through the frame that is made of magnetically conducting material.

Referring to FIGS. 2 and 3, the flux-guiding magnets 14 together with the excitation current going through the excitation coils 23 and 24 produce the north (N) and south (S) poles on the exterior of rotor 11 that faces the stator 17 and the radial air gap 20. This rotor flux in the radial air gap 20 can be either enhanced or weakened according to the polarity of the DC excitation in the excitation assemblies 23, 24 that face the ends the rotor 11. Subsequently, the radial air gap 20 receives the rotor flux from the rotor 11, which interacts with the primary flux induced by the stator windings 17b to produce a torque.

FIGS. 7 and 8 show the flux-guiding magnets 14 inside the rotor lamination 11b. As an option, a strong flux guiding magnet set 14a and a weak magnet 14b can be chosen.

Figure 8A:
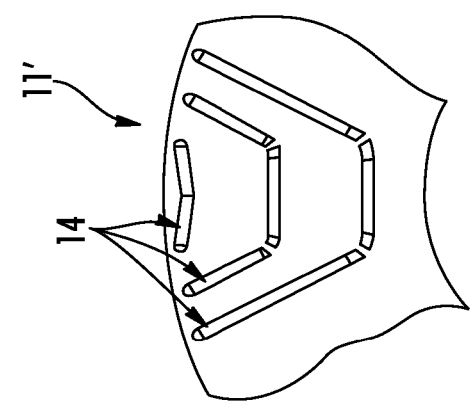
FIG. 8a is an end view of a pole having multiple sets of flux-guide magnets for improving reluctance-torque production.

FIG. 8a shows a rotor assembly 11' illustrating that the flux-guiding magnets 14 can be modified to consist of multiple sets of magnets for each pole disposed on multiple grooves to increase the reluctance torque value.

Figure 9:
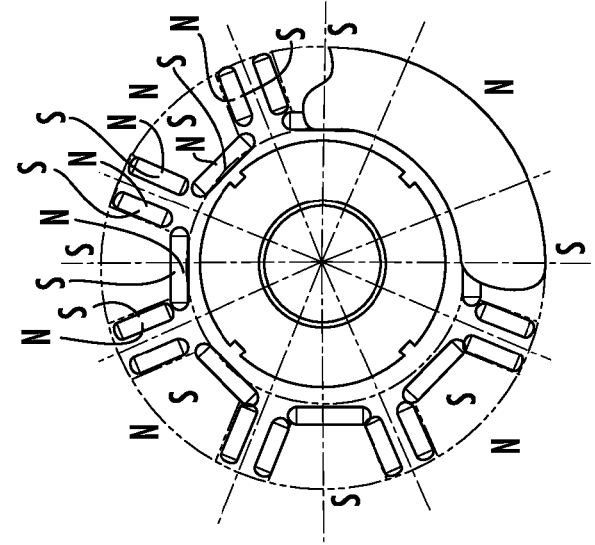

FIGS. 9 and 10 show the rotor with and without reluctance side poles 15 installed, respectively.

Figure 13:
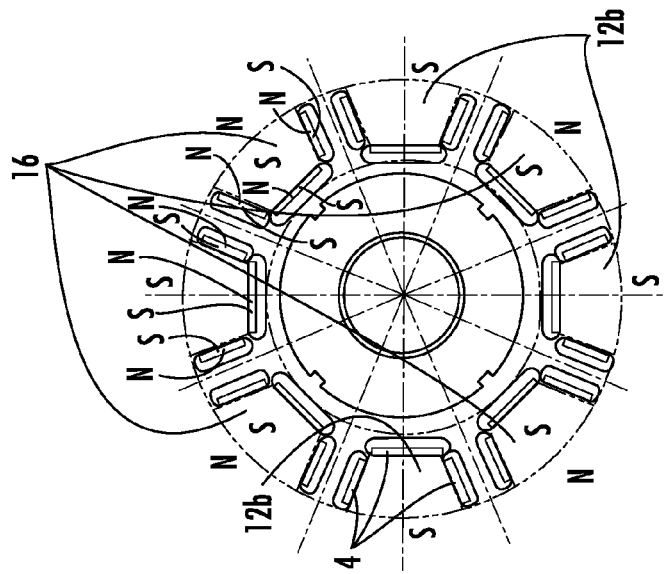
FIGS. 11, 12, and 13 are another view of the improved features of the invention with the excitation coil flux shown.
Figure 11:
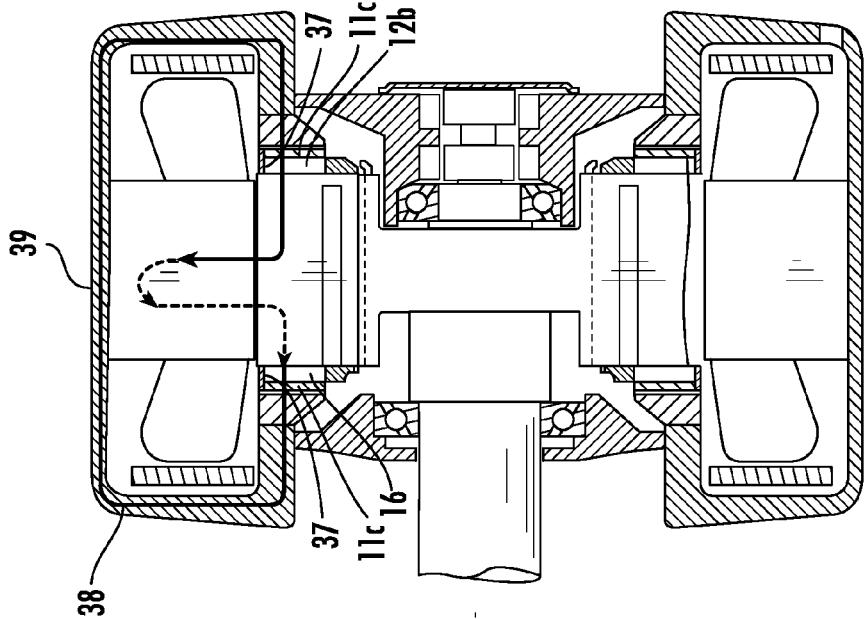
Figure 12:
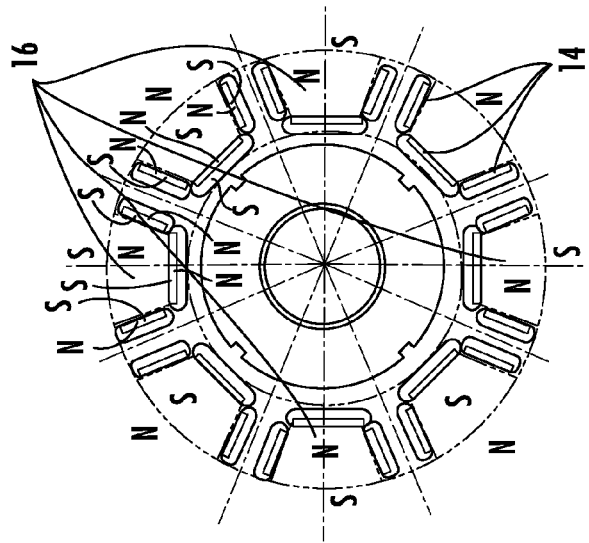

FIGS. 11, 12 and 13 illustrate an embodiment of the improvements of the current invention.

The functions of each optional improvement are described as follows. The flux-guiding magnets 14 and side magnets 16 are used to conduct the axial fluxes and to block the unwanted axial leakage flux during field enhancement. The flux-guiding magnets 14 are typically thin with respect to the width of the grooves in which they are situated. A thinner magnet can reduce the cost of permanent magnets. During field enhancement the higher air-gap flux density is produced by the brushless field excitation. Therefore, a weaker and thinner PM can do the job as part of the flux-guiding barriers to discourage the flux going across the grooves. The ferromagnetic end plate 11c smoothes the axial flux and produces a return path for the side magnets 16. The ring band 37 prevents the side poles, side magnets and end pieces from flying apart due to the centrifugal force.

The HSUB technology is for electric vehicle and hybrid electric vehicle applications. However, the HSUB technology certainly can be used for other applications where the use of electricity to produce torque and motion is involved.

The invention is applicable to both AC synchronous and DC brushless machines and to both motors and generators.

This has been a description of the preferred embodiments of the invention. The present invention is intended to encompass additional embodiments including modifications to the details described above which would nevertheless come within the scope of the following claims.

What is claimed is:

1. A brushless electric machine comprising:
a cylindrical stator;
a rotor having an axis of rotation, the rotor being spaced from the stator to define an annular primary air gap that receives an AC flux from the stator, the rotor having a plurality of longitudinal pole portions disposed parallel to the axis of rotation and alternating in polarity around a circumference of the rotor, wherein each longitudinal pole portion comprises portions of permanent magnet (PM) material positioned to form boundaries separating the longitudinal pole portions of alternating polarity from an interior of the rotor and from each other to define PM poles and wherein the longitudinal pole portions each have a first end and an opposing second end;
a first plurality of side magnets disposed adjacent at least a portion of the first ends of the longitudinal pole portions;
a second plurality of side magnets disposed adjacent a least a portion of the second ends of the longitudinal pole portions;
a first ferromagnetic end plate disposed adjacent the first plurality of side magnets wherein the first plurality of side magnets are disposed between the first ferromagnetic end plate and the first ends of the longitudinal pole portions;
a second ferromagnetic end plate disposed adjacent the second plurality of side magnets wherein the second plurality of side magnets are disposed between the second ferromagnetic end plate and the second ends of the longitudinal pole portions, wherein magnetic flux in the longitudinal pole portions is directed axially and oppositely in polarity in adjacent longitudinal pole portions;
a first plurality of side poles disposed adjacent at least a portion of the first ends of the longitudinal pole portions, wherein the first plurality of side poles are disposed between the first ferromagnetic end plate and the first ends of the longitudinal pole portions; and
a second plurality of side poles disposed adjacent a least a portion of the second ends of the longitudinal pole portions and the second plurality of side poles are disposed between the second ferromagnetic end plate and the second ends of the longitudinal pole portions.

2. The brushless electric machine of claim 1 wherein the first plurality of side magnets is equal in number to the first plurality of side poles and the second plurality of side magnets is equal in number to the second plurality of side poles.

3. A brushless electric machine comprising:
a cylindrical stator;
a rotor having an axis of rotation, the rotor being spaced from the stator to define an annular primary air gap that receives an AC flux from the stator, the rotor having a plurality of longitudinal pole portions disposed parallel to the axis of rotation and alternating in polarity around a circumference of the rotor, wherein the longitudinal pole portions each have a first end and an opposing second end;
a first plurality of side magnets disposed adjacent at least a portion of the first ends of the longitudinal pole portions;
a second plurality of side magnets disposed adjacent a least a portion of the second ends of the longitudinal pole portions;
a first ferromagnetic end plate disposed adjacent the first plurality of side magnets wherein the first plurality of side magnets are disposed between the first ferromagnetic end plate and the first ends of the longitudinal pole portions;
a second ferromagnetic end plate disposed adjacent the second plurality of side magnets wherein the second plurality of side magnets are disposed between the second ferromagnetic end plate and the second ends of the longitudinal pole portions, wherein magnetic flux in the longitudinal pole portions is directed axially and oppositely in polarity in adjacent longitudinal pole portions;
a first plurality of side poles disposed adjacent at least a portion of the first ends of the longitudinal pole portions, wherein the first plurality of side poles are disposed between the first ferromagnetic end plate and the first ends of the longitudinal pole portions; and
a second plurality of side poles disposed adjacent a least a portion of the second ends of the longitudinal pole portions and the second plurality of side poles are disposed between the second ferromagnetic end plate and the second ends of the longitudinal pole portions.

4. The brushless electric machine of claim 3 wherein the first plurality of side magnets is equal in number to the first plurality of side poles and the second plurality of side magnets is equal in number to the second plurality of side poles.

* * * * *